April 27, 1954     H. NEVILLE, JR., ET AL     2,676,729
REINFORCED LAMINATED MOLDED RECEPTACLE
Filed Jan. 23 1952     2 Sheets-Sheet 1

INVENTOR.
HUGH NEVILLE JR.
OLIVER G. R. FERGUSON
BY
W. K. Hulbert
ATTORNEY

April 27, 1954     H. NEVILLE, JR., ET AL     2,676,729
REINFORCED LAMINATED MOLDED RECEPTACLE
Filed Jan. 23 1952     2 Sheets-Sheet 2

INVENTOR.
HUGH NEVILLE JR.
BY OLIVER G. R. FERGUSON

ATTORNEY

Patented Apr. 27, 1954

2,676,729

UNITED STATES PATENT OFFICE 2,676,729

REINFORCED LAMINATED MOLDED RECEPTACLE

Hugh Neville, Jr., Tiverton, R. I., and Oliver G. R. Ferguson, Fairhaven, Mass., assignors to Laminex Corporation, Fall River, Mass., a corporation of Massachusetts Application January 23, 1952, Serial No. 267,772

3 Claims. (Cl. 220—71)

This invention relates to improved laminated molded plastic products and a method of molding the same. More particularly it is concerned with a new and improved molded receptacle having an absolutely smooth interior finish, free from sharp angles, and having external reinforcing ribs, the receptacle having novel provision for the attachment of accessories thereto such as a bumper rail and casters.

It is now well known to produce laminated molded articles by the use of a low pressure suction system or similar process, for example, such as that described in U. S. Patent No. 2,495,640. In one form of the process of said patent a liquid polymerizable resinous material is used to impregnate a sheet of fibrous material, fiber glass for example, the fibrous material being laid within a mold and the liquid plastic being drawn into the mold by use of suction so as to impregnate completely and uniformly the fibrous sheet, the latter serving as a reinforcing agent.

We have found that in carrying out the above described prior art method, numerous difficulties are encountered when it is desired to produce receptacles of considerable size with smooth interiors which may be subjected in use to very hard service and which require the provision of means for the attachment of accessory equipment not molded integrally therewith. Examples of such receptacles are hand trucks which are used for conveying yarns, etc., from place to place in textile mills, and which require casters and bumper rails. Similar problems exist with respect to the chemically inert polymerized resinous tanks used in the chemical industry where, again, it is desirable to provide means for attaching external accessories without in any way marring its completely smooth inner surface.

Prior art processes and containers appear inadequate in several respects. In the first place, in order to provide a container of sufficient strength for the many uses encountered, according to prior art teaching, it would be necessary to build up an excessive number of laminations of fibrous filler and plastic, thus greatly increasing the weight of the finished product as well as requiring large quantities of expensive materials. Furthermore, the attachment of casters, bumper rails, etc., to such a prior art product would require the piercing of the wall of the container for the insertion of attaching devices, such as bolts, thus marring the smooth interior finish and, in the case of chemical tanks, increasing the danger of leaks while permitting contact between corrosive chemicals held therein and metallic bolt heads or the like.

With the foregoing in mind, one of the objects of our invention is to provide a new and improved receptacle of the type described of minimum weight and yet having the requisite qualities of ruggedness for the purposes for which it is to be used.

Another object of the invention is to provide novel means for attachment to a receptacle of the type described of casters, bumper rails, etc., without weakening the structure or marring the smooth interior finish of the container.

A further object of the invention is the provision in a novel receptacle of the type described of new and improved means for reinforcing its rim, permitting the employment of a strengthening member, such as hollow pipe, whose index of expansion may be quite different from that of the molded material composing the receptacle.

Still another object of the invention is to provide an improved method of molding integral strengthening portions in a receptacle of the type described, thereby greatly reducing the number of laminations required in the molded article in order to provide the requisite strength.

Still other objects, advantages and features of the invention will appear from the following detailed description taken in connection with the accompanying drawings, illustrating a preferred embodiment of the same, in which like numerals refer to like parts in the several views, and in which—

Fig. 1 is a view in perspective of a completed container according to the invention;

Fig. 2 is a section on either lines 2—2 of Fig. 1 showing a side-wall and a portion of the bottom;

Fig. 3 is a fragmentary sectional view showing the molding of integral caster retaining means in the bottom of the container of Fig. 1;

Fig. 6 is a fragmentary sectional view on line 6—6 of Fig. 1 showing the bumper rail retaining assembly; and Fig. 7 is a section on line 7—7 of Fig. 6.

Figure 4:
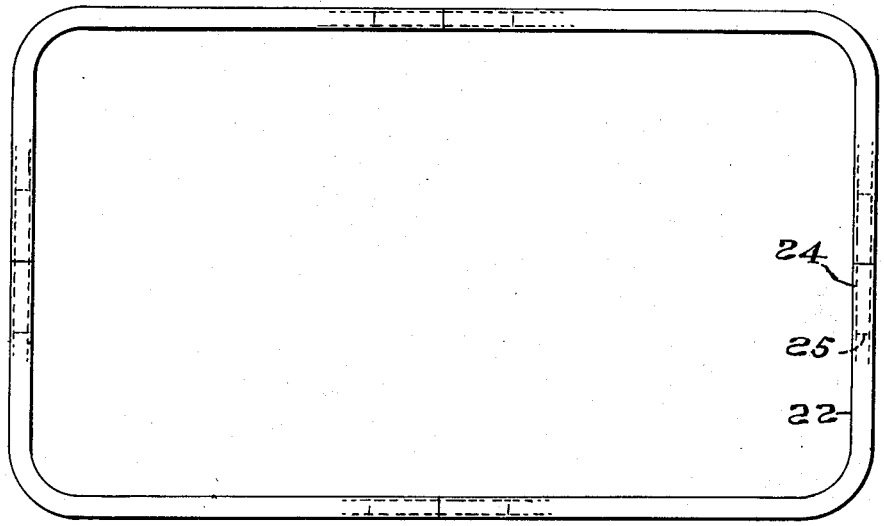
Fig. 4 is a plan view of the top rail of the container of Fig. 1, indicating the butted reinforcing pipe sections.
Figure 4:
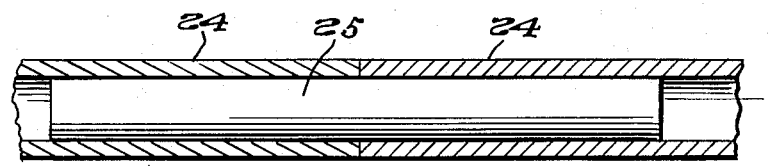

A typical molded container according to the invention is disclosed in Fig. 1 and indicated generally by the numeral 8. It is adapted, for example, for use as a truck in textile mills or for holding and transporting chemicals, and, therefore, is adapted to be equipped with casters. For convenience, we have referred to the product of the invention in the present specification and claims as a "receptacle," it being understood that this term embraces containers of a number of different uses which, nevertheless, embody the features of our invention.

The body of the receptacle 8 comprises side and end walls 10 and a bottom 14, said walls and bottom being composed of an integral laminated plastic sheet including a fibrous strengthening agent as hereinafter more fully described.

As will be observed in the drawings, preferably the sides 10 of the receptacle are tapered to facilitate removal from the molds after curing. Likewise, all corners and edges are smoothly curved on a radius in order to obtain additional strength and further to facilitate such removal. The use of these smooth curved edges has a number of additional advantages, such as the facilitation of cleaning, fast drainage, improved appearance and the elimination of plastic residue from the corners. Furthermore, in the use of a vacuum type of molding process the radius permits more rapid molding since there is a substantial reduction in blowholes and improvement in the complete impregnation of the fiber sheet in the corners. These rounded corners are stronger and, therefore, the receptacles of the invention can be lifted and moved about with less danger of cracking of the laminate. When the receptacle is used for holding corrosive chemicals, the smooth curved lower outside edges have the additional advantage of causing any corrosive liquids spilled down from the side to drip at a point beneath the receptacle inwardly from its outer edge, thus safeguarding the feet of operators standing close to the tank.

The side walls 10 of the receptacle are strengthened by the provision of a series of integral vertically disposed reinforcing ribs 16. These ribs involve a minimum of additional weight and a maximum of reinforcement, replacing ordinary laminated walls of greatly increased thickness. Furthermore, the ribs 16 provide a convenient means for mounting suitable retaining devices for holding the removable bumper rail 18 in place around the side of the container without piercing the walls 10 at any place. The bumper, of course, is provided to preserve the receptacle against accidental cracking or breakage due to collisions while being rolled about the factory. Since the bumper rail 18 is replaceable the useful life of the receptacle may be greatly prolonged by replacing battered or broken rails from time to time.

As best seen in Figs. 6 and 7, the ribs 16 are molded integrally with the side walls 10 and are reinforced with a filler piece 20 of wood, as shown, or other suitable materials, such as steel or metal pipe. In the actual molding process by which the ribbed receptacle is produced, we first provide a female mold having recesses corresponding to the vertical ribs into which we place one or more plies of fiber glass or other suitable fabric. Over the fibrous material, we next place the filler piece of wood or steel and fill the ribbed portions of the mold with a quantity of polyester resin and catalyst and allow the same to cure. This operation is performed prior to closing of the mold or insertion of the remaining materials for completing the receptacle.

When the ribbed portions are cured the main body of the receptacle is then draped in the male mold. The female mold is placed over it and the resin is then drawn between the molds, completely filling the same and impregnating the fibrous material while also bonding the already cured ribs to the side walls. We have found that ribs which are molded integrally with the walls in this way greatly add to the rigidity and durability of the article, while only slightly increasing its weight. The danger of accidental fracture is virtually eliminated.

As already pointed out, the use of these matched dyes to mold a one-piece unit having reinforcing ribs incorporated therewith permits the mounting of anchor bolts, or other suitable devices, for attaching the bumper rail without in any way disturbing the smooth interior surface of the receptacle and likewise permitting a one-step manufacturing operation instead of two or more. The vertical ribs alone may serve as a bumper where the need for a separate removable rail is not present. Furthermore, we have found that preferably the ribs 16 should be vertically disposed rather than horizontally in order to reinforce a larger percentage of the surface area of the container.

Figure 5:
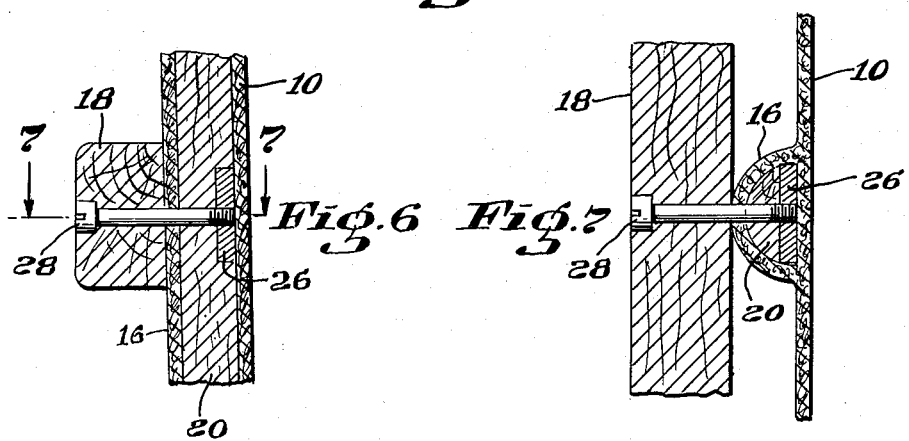
Fig. 5 is a longitudinal sectional view of a portion of the railing as shown in Fig. 4 illustrating the means by which the butted reinforcing pipe sections are held together.

In containers of the type herein disclosed, it is highly desirable to provide a top reinforcing rail 22. Here again such rail should be integral with the rest of the structure so as to permit molding the entire construction as a unit and greatly adding to its strength. As seen in Figs. 2, 4 and 5 the rail 22, according to the invention, is composed of butted sections of pipe 24, held at their joints by internal sleeves or plugs 25 and molded into the upper portions of the side walls 10 so as to be integral therewith. We have found that the coefficient of expansion of impregnated fiber glass or other reinforcing materials are so different from those of various suitable filler materials, such as wood, steel, aluminum, etc., that it would be exceedingly difficult to incorporate such reinforcing members in the form of a continuous piece without placing a strain on the plastic during curing resulting in cracks and broken sections wherever the strain occurred. We have overcome this problem by employing a plurality of butted sections of pipe of malleable iron or steel of uniform diameter held aligned by internal sleeves of iron or steel bar stock at the joints. An additional advantage of this construction is that the fiber glass may be laid up or sewn around the pipe in a uniform manner, maintaining the same diameter through the entire length of the rail, there being no swelling at the joints. The butted joints permit sufficient expansion and contraction of the sections during curing without producing cracks or weak spots in the finished product. The internal sleeves serve the additional function of strengthening the rail at each joint.

In actual practice, we have found that rails manufactured in accordance with the foregoing processes are very rigid, have their greatest strength at the joints and may be uniformly successfully molded whereas other reinforcing means, such as continuous metal rods or rope, are unsatisfactory. Preferably, in order to insure uniform distribution of the resinous material around the pipe section 24, we wrap the pipe in the fibrous sheet, which is sewn tightly about it prior to molding, to provide positive distribution of reinforcing fibrous material around the pipe, thus assuring a more uniform result and reducing the possibility of cracking.

In much the same way the wood fillers 20 are incorporated in the ribs 16 and at the same time there are included drilled and tapped steel mounting plates 26 which are adapted to receive the mounting bolts 28 which hold the bumper 18 to the ribs. The same procedure is likewise followed in reinforcing the bottom 14 and providing the same with mounting plates 30 for holding the casters 32. In each case the steel plate (26 or 30) which has previously been drilled and tapped in the proper place is embedded in molded fiber glass. The plate 26 is fitted into a suitable cavity in the filler piece 20 and the plate 30 is fitted beneath a strengthening sheet of plywood 34 which is integrally bonded into the bottom of the container. The tapped holes in the steel plates are, prior to laminating, filled with wax in order to prevent the entrance therein of the resinous material during the molding operation. After the resin is cured the resin and fiber glass are drilled through at the location of the holes, the wax reamed out and, in the case of the plates 30, the casters are attached by means of cap screws 36. As previously pointed out in the case of the bumper rail 18 attachment is effected by means of the cap screws 28.

The caster mountings, while having the principal advantage of permitting the sturdy attachment of casters without in any way interfering with the smoothness and symmetry of the interior surface of the receptacle, also have the additional advantage of permitting easy removal of the casters for repair or replacement, as well as allowing removal thereof for nesting of the receptacle in shipment or storage.

From the foregoing discussion the numerous advantages and features of the invention will be readily apparent. The entire receptacle unit is molded as an integral piece in a single operation, thus reducing to a minimum the number of steps required in completing the article. The reinforced rib and upper rail construction provide greatly increased strength without excessive increase in weight, while effecting great economies of material. The smooth, seamless interior of the receptacle free from metallic retaining members meets the most exacting requirements of industry for this type of truck or tank.

While we have herein disclosed and described a preferred embodiment of the invention, it will be appreciated that the same is susceptible of various modifications and changes within the spirit and scope of the appended claims.

We claim:

1. A reinforced receptacle having a smooth interior surface free from sharp angles or projections, which comprises integral wall and bottom portions of laminated plastic with a fibrous filler, said walls being reinforced with external integral ribs, each rib comprising a rigid reinforcing member bonded into and surrounded by said plastic and filler, the rim of said receptacle being provided with a reinforcing rail comprising a series of butted sections of pipe bonded into said plastic and filler and a corresponding series of internal rods fitting within adjacent sections for holding the joints therebetween in line.

2. A receptacle in accordance with claim 1 having mounting members molded integrally therewith for mounting external attachments thereon.

3. A receptacle in accordance with claim 1 having metallic caster mounting plates bonded integrally with said bottom portion.

References Cited in the file of this patent

UNITED STATES PATENTS

| Number | Name | Date |
| --- | --- | --- |
| 2,237,048 | Carter | Apr. 1, 1941 |
| 2,260,651 | Annen | Oct. 28, 1941 |
| 2,294,589 | Waterbury | Sept. 1, 1942 |
| 2,357,806 | Borkland | Sept. 12, 1944 |